(No Model.)
J. I. METTLER
HAND PLOW.
No. 488,397. Patented Dec. 20, 1892.
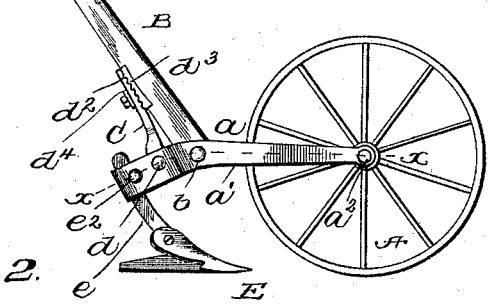
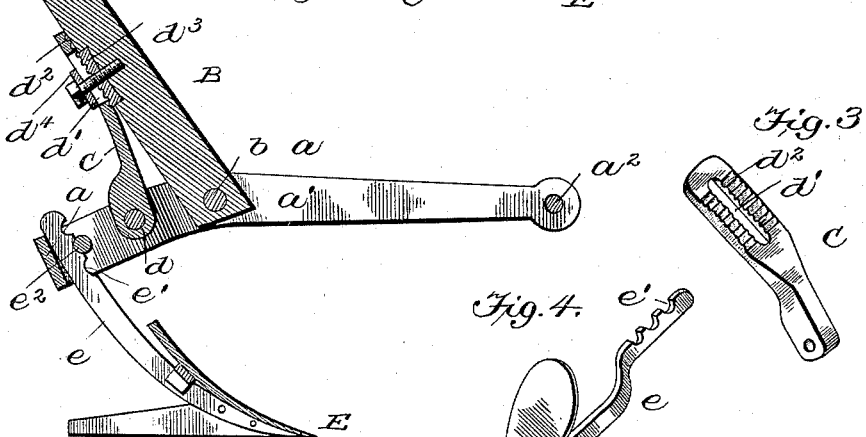
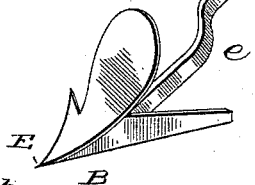
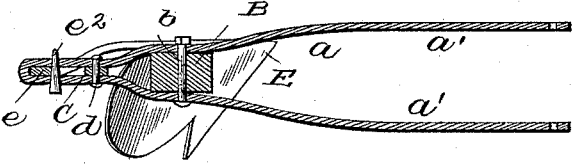
Witnesses
Inventor
James I. Mettler
By his Attorney

UNITED STATES PATENT OFFICE.

JAMES I. METTLER, OF CRESTON, ILLINOIS, ASSIGNOR OF ONE-HALF TO FRANK W. METTLER, OF HELENA, MONTANA.

HAND-PLOW.

SPECIFICATION forming part of Letters Patent No. 488,397, dated December 20, 1892.

Application filed April 7, 1892. Serial No. 428,170. (No model.)

*To all whom it may concern:*

Be it known that I, JAMES I. METTLER, a citizen of the United States of America, residing at Creston, in the county of Ogle and State of Illinois, have invented certain new and useful Improvements in Hand-Plows, of which the following is a specification, reference being had therein to the accompanying drawings.

This invention relates to a new and improved hand plow and has for its object the production of a plow of this class which shall comprise advantages in points of simplicity, durability and general efficiency and in which the handle bar and plow-point and its standard can be readily and easily adjusted and rigidly held in place.

The invention comprises a hand-plow having a bail or frame pivotally connected to the axle of a main carrying-wheel, a handle bar pivotally mounted between the side-bars of said bail or frame, an arm also pivoted to said bail or frame and having a fixed and adjustable connection with said handle-bar, and a plow standard adjustably secured in said bail or frame at the rear end thereof, substantially as hereinafter fully set forth and particularly pointed out in the claims.

In the accompanying drawings:—Figure 1 is a view in side elevation of my improved plow. Fig. 2 is a vertical longitudinal sectional view thereof, the wheel being omitted. Fig. 3 is a view showing the adjusting arm detached. Fig. 4 is a similar view of the plow point and its standard. Fig. 5 is a horizontal sectional view on the line $x$—$x$, Fig. 1.

Referring to the drawings, A designates the carrying wheel, and $a$ a bail or frame preferably formed from one piece of bar metal and having corresponding sides $a'$, which at their forward ends support the axle $a^2$ of wheel A. The width of the bail or frame $a$ in rear of wheel A is slightly lessened.

B is the handle bar pivotally mounted at its lower end between the side bars of bail or frame $a$ by a cross-pin $b$, and to its upper end is secured a cross-bar $b'$ having blocks $b^2$ pivotally attached to its ends for ease and convenience of operator in using the plow. In rear of handle-bar B is an arm C likewise pivotally mounted by a pin $d$ between the side-bars of bail or frame $a$. This arm has a slot $d'$ running longitudinally therein and on its inner face are grooves or corrugations $d^3$ corresponding to the grooves or corrugations of a washer plate $d^3$ located between arms C and handle-bar B, said arm being rigidly held at the desired point of adjustment by a set-screw or bolt the head of which binds against a circular washer $d^4$ on the outer surface of arm C. By loosening this screw or bolt arm C can be adjusted according to the inclination it is desired to give to handle-bar B. When tightened the parts are firmly held together by arm C engaging the grooved or corrugated washer-plate $d^3$ which rests in a cut-away portion of handle bar B.

E is the plow-point having the usual landside and mold-board connected thereto, and from this plow-point extends a standard $e$ which is passed between the side-bars of bail or frame $a$ at the extreme rear end of the latter. This standard has grooves or recesses $e'$ in its forward edge and is held at the desired point of adjustment by a tapering pin $e^2$ passed through coincident holes or openings in the side bars of the bail or frame and entering any one of the grooves or recesses in the standard, the rear edge of the latter bearing against the rear end of bail or frame $a$. Hence the plow-point and its standard can be adjusted and held at any desired height. The standard is slightly bent or curved so as to throw the plow-point to one side of the carrying-wheel.

From what has been said it will be seen that I have produced a hand or garden plow which is extremely simple in construction and inexpensive, and one in which the adjustment of the handle-bar and plow-point can be readily and easily effected.

I claim as my invention:—

1. The herein-described improved hand plow, comprising the frame, the handle-bar pivotally secured to said frame, the pivoted arm having a slot therein and a grooved or corrugated inner face, the washer-plate located between said handle bar and arm and having a central aperture and an outer grooved or corrugated face, and the set-screw or bolt passed through said arm and washer-plate, substantially as set forth.

2. The herein-described improved hand-plow, comprising the bail or frame having corresponding side-bars, the wheel having its axle supported by said side-bars, the handle bar pivotally mounted at its lower end between said side-bars, the arm also pivoted between said side-bars and having a slot therein and grooved or corrugated on its inner face, the apertured washer-plate also grooved or corrugated, the set-screw or bolt whereby said arm is held to said handle-bar and the plow-point having its standard provided with grooves or recesses in its edge and located between said side-bars, and the pin holding said standard passed through apertures in said side bars, as set forth.

In testimony whereof I affix my signature in presence of two witnesses.

JAMES I. METTLER.

Witnesses:
B. KNAPP,
G. SCHERMERHON.